(12) United States Patent
Asai (10) Patent No.: US 6,412,609 B2
(45) Date of Patent: Jul. 2, 2002

(54) BRAKE CABLE MOUNTING STRUCTURE FOR A DRUM BRAKE

(75) Inventor: Seiji Asai, Okazaki (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/737,756

(22) Filed: Dec. 18, 2000

(30) Foreign Application Priority Data

Dec. 16, 1999 (JP) ............................................. 11-358165

(51) Int. Cl.⁷ .............................................. F16D 51/00
(52) U.S. Cl. ................. 188/79.61; 188/79.55; 188/2 D; 188/325; 188/78
(58) Field of Search ...................... 188/79.51, 79.55, 188/79.56, 79.57, 79.59, 79.61, 79.63, 325, 78, 2 D (56) References Cited

U.S. PATENT DOCUMENTS

| 2,259,266 A | * | 10/1941 | Rabe | ........................ | 188/79.61 |
| 5,062,504 A | * | 11/1991 | Yamamoto | ............... | 188/79.56 |
| 5,085,296 A | * | 2/1992 | Carr et al. | ............... | 188/79.55 |
| 5,322,145 A | * | 6/1994 | Evans | ........................ | 188/325 |

FOREIGN PATENT DOCUMENTS

| DE | 3428134 | | 2/1986 |
| DE | 4327557 | | 2/1995 |
| GB | 2162602 | | 2/1986 |
| JP | 62-98034 | * | 5/1987 |
| JP | 6337027 | | 12/1994 |
| JP | 11-37189 | * | 2/1999 |

* cited by examiner

Primary Examiner—Christopher P. Schwartz
Assistant Examiner—Mariano Sy
(74) Attorney, Agent, or Firm—Liniak, Berenato, Longacre & White (57) ABSTRACT

A brake cable mounting structure for a drum brake, in which even if the distance from the brake mounting surface to the center of the brake shoes in the width direction is short, the layout of the brake cable mounting section and the mechanical expander is efficient and effectively provided. Further, the anchor only need to support the braking force, thereby making the device smaller and lighter. The brake cable mounting structure of this invention is characterized in that the inner cable of the brake cable extends out from the brake; and the guide pipe on which the outer casing of the brake cable is integrally fixed with the back plate.

4 Claims, 7 Drawing Sheets

PRIOR ART

FIG. 5

PRIOR ART

FIG. 6

PRIOR ART

FIG. 7
PRIOR ART

BRAKE CABLE MOUNTING STRUCTURE FOR A DRUM BRAKE

BACKGROUND OF INVENTION

1. Field of the Invention

This invention relates to a drum brake comprising a mechanical expander spreading a pair of brake shoes apart. More specifically, this invention relates to a brake cable mounting structure which enables remote operation of the mechanical expander.

2. Description of Related Art

Figure 4:
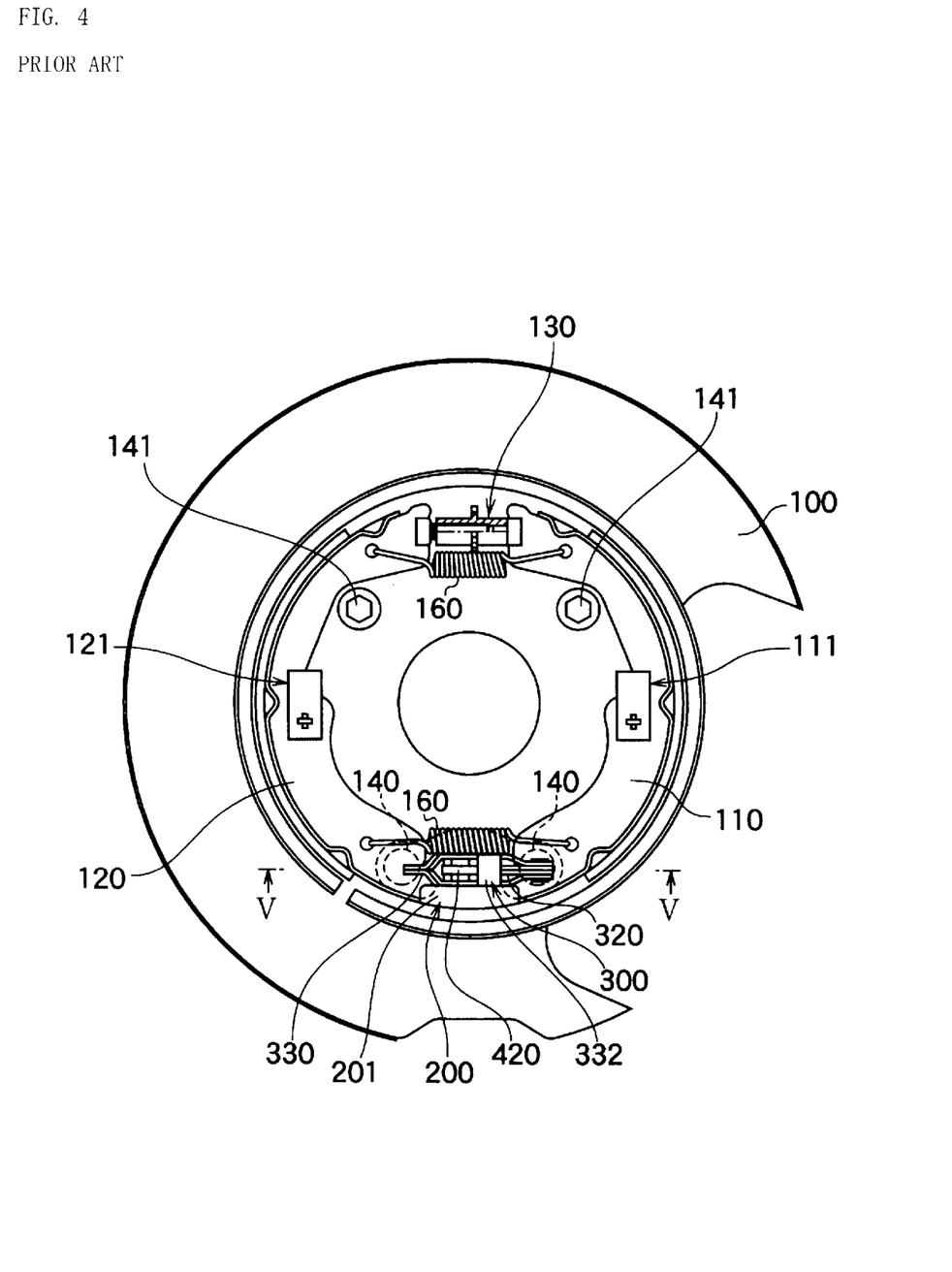
FIG. 4 is a plan view of the conventional drum brake device.

One known brake cable mounting structure for the drum brake is disclosed in the Japanese Patent Application Unexamined Publication Number 6-337027 filed by this applicant. FIGS. 4–7 explain a drum brake device employing this kind of the brake cable mounting structure. As depicted in FIG. 4, a pair of brake shoes 110, 120 are moveably mounted on a back plate 100 with shoe holding devices 111, 121. Lower adjacent ends of the brake shoes 110, 120 abut against a supporting portion 201 of an almost L-shaped anchor 200 while upper adjacent ends thereof are connected via an adjuster 130. An upper shoe return spring 160 is extended between the upper adjacent ends of the brake shoes 10, 120 and a lower shoe return spring 160 is extended between the lower adjacent ends thereof, maintaining the abutment of the two brake shoes 110, 120 against the adjuster 130 and the anchor 200.

Figure 5:
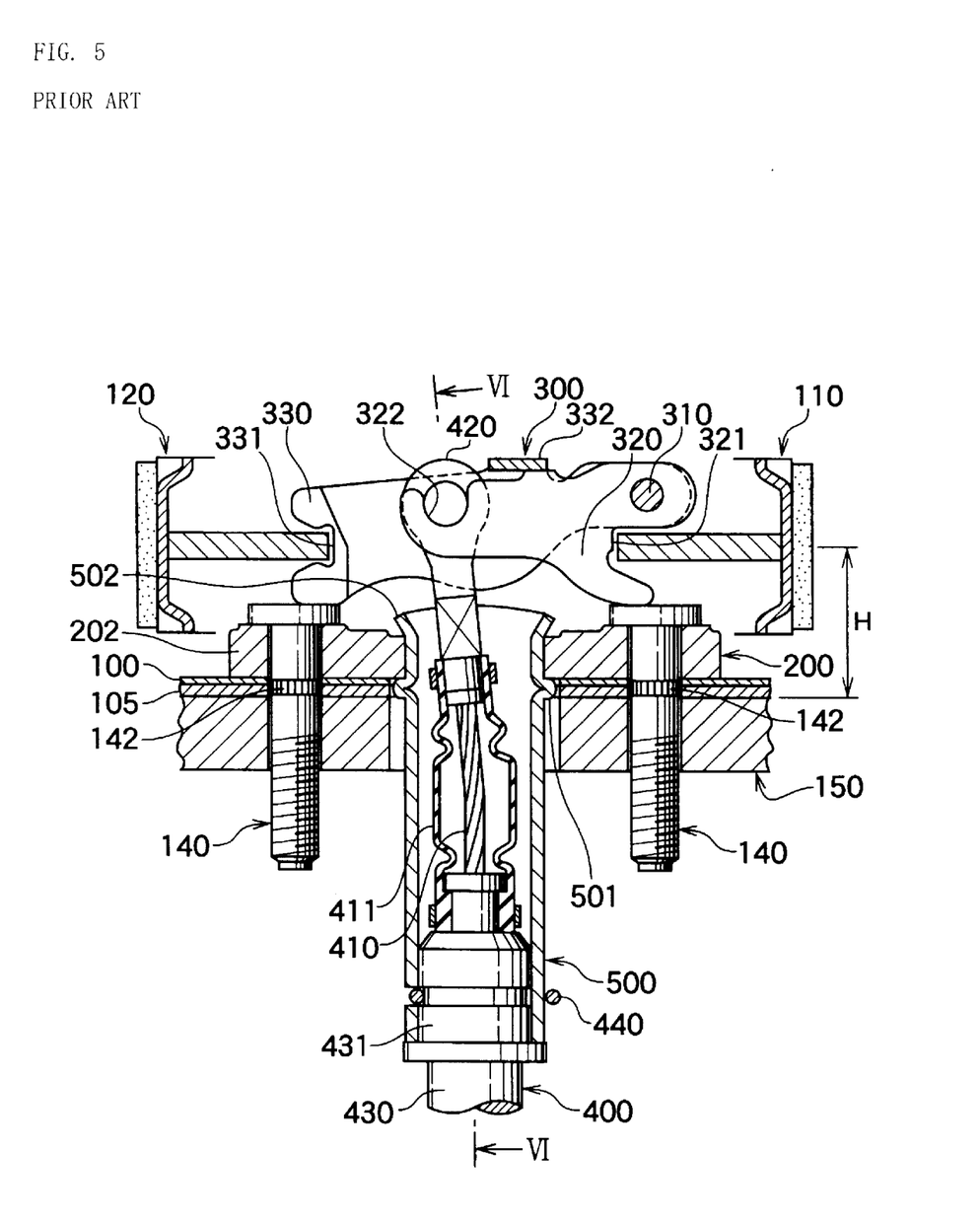
FIG. 5 is a cross-section view of FIG. 4 taken along the line V—V.

A mechanical expander 300 comprising a brake lever 320; a strut 330; and a lever pin 310, is positioned adjacent to the supporting portion 201 of the anchor 200 between the brake shoes 110, 120 (see FIG. 4). As depicted in FIG. 5, the brake lever 320 comprising two facing long plates has a notched groove 321 formed at the superimposing portion on the right side of the plates being functionally engaged with the right brake shoe 110. An arc-shaped groove 322 formed on the forked legs on the left side of the plates receives a cable end nipple 420 of a brake cable 400. The strut 330, integrally formed from a deformed piece of plate, comprises two facing plate portions connected on their upper edges by a bridge 332 and positioned between the brake shoes 110, 120. A notched groove 331 formed at the superimposing portion on the left side of the strut 330 is functionally engaged with the left brake shoe 120.

The brake lever 320 is inserted from the opposite side of the bridge 332 into a space formed between the facing plate portions of the strut 330, and upper right ends of the brake lever 320 is pivotally supported relative to the strut 330 with the lever pin 310 as depicted in FIG. 5.

Figure 6:
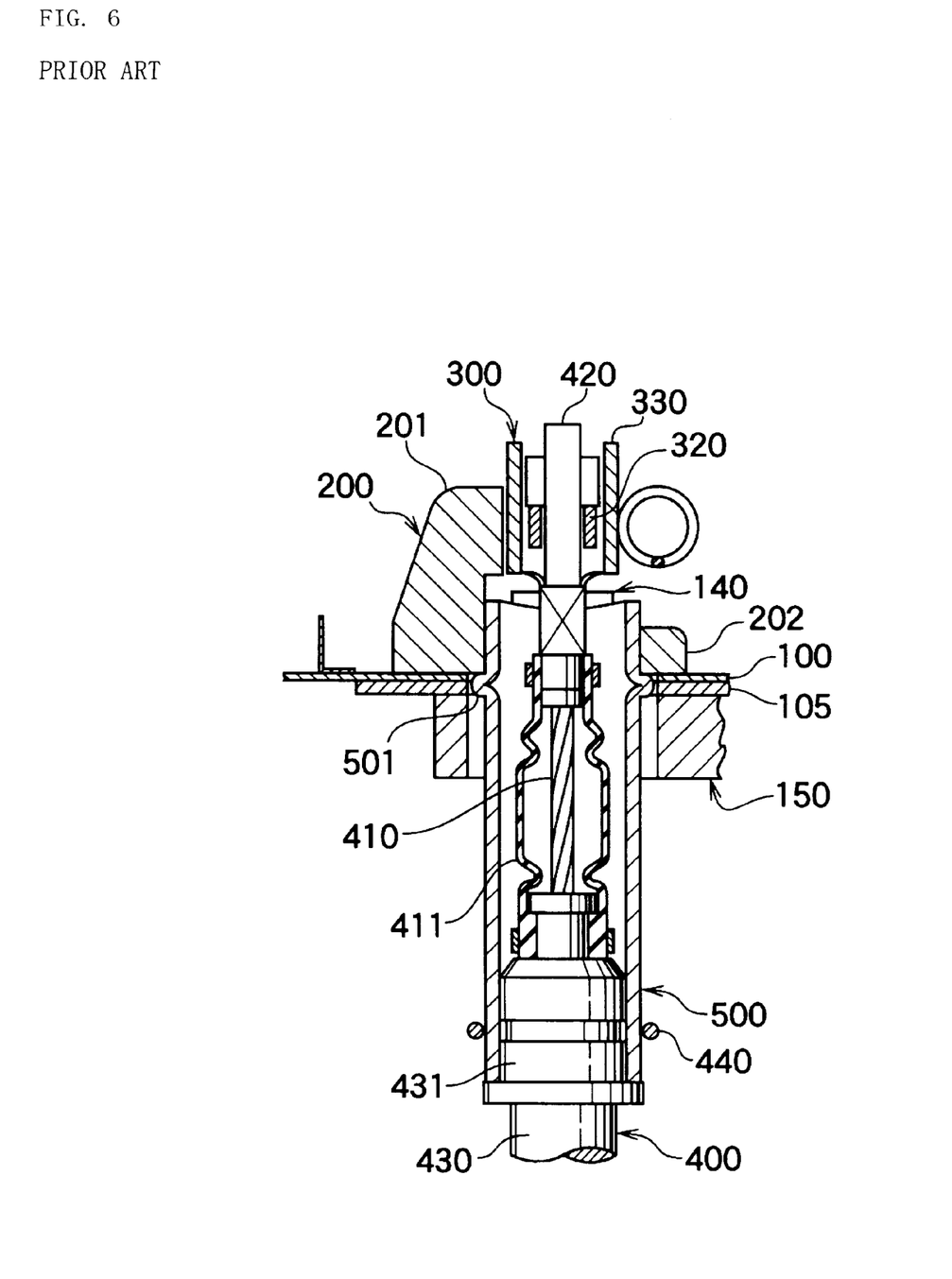
FIG. 6 is a cross-section view of FIG. 5 taken along the line VI—VI.
Figure 7:
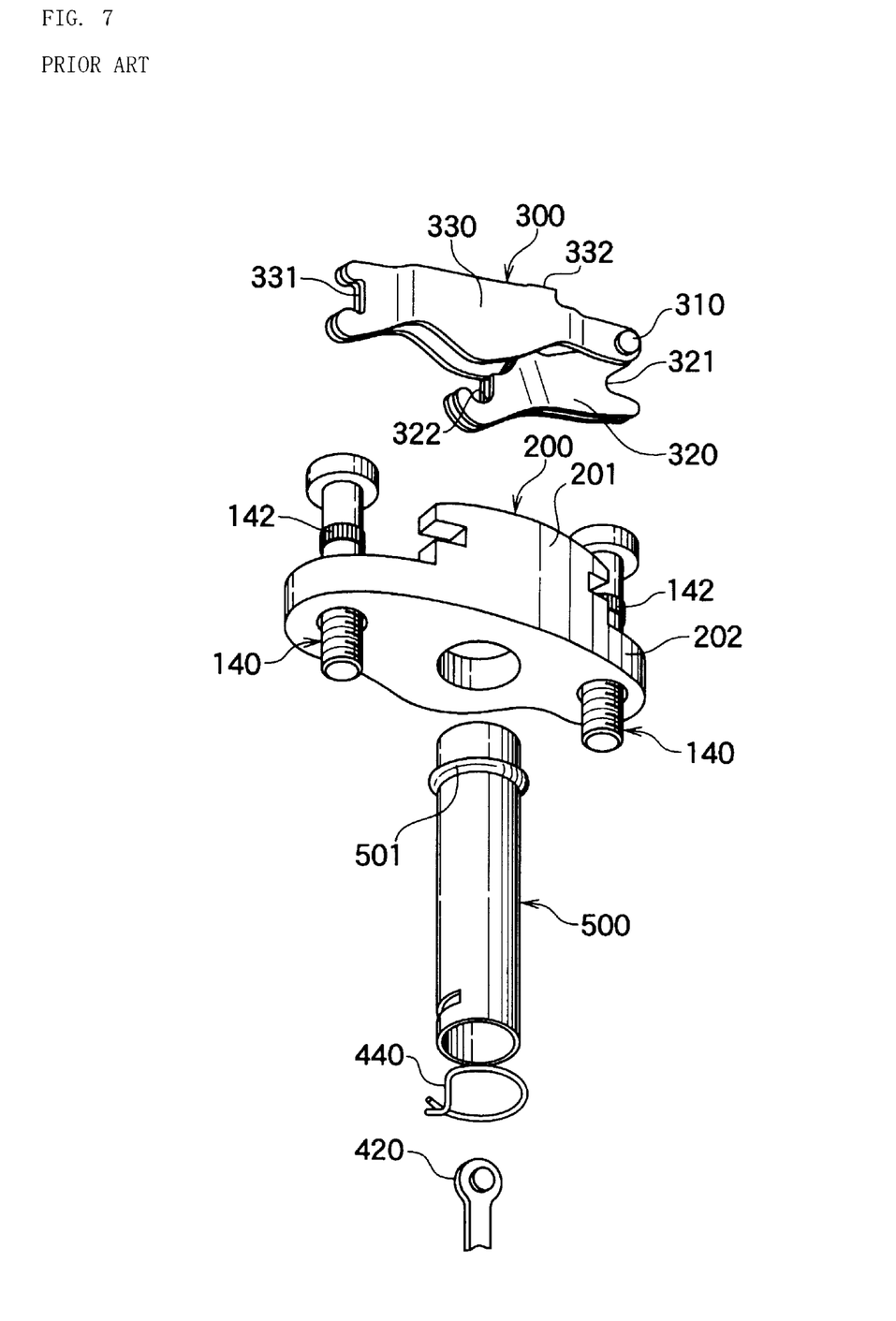
FIG. 7 is an exploded view of the brake actuating part.

As is evident from FIG. 5, clockwise rotation of the brake lever 320 with respect to the lever pin 310 is restricted when the brake lever 320 abuts against the bridge 332 of the strut 330. A guide pipe 500 and the brake cable 400, which act as a remote force transmitting member, pass through the back plate 100 to engage the cable end nipple 420 with the arc-shaped groove 322 as an input force portion of the brake lever 320. The guide pipe 500 depicted in FIGS. 5–7 is so designed that the overhanging portion 501, integrally formed on the intermediate portion thereof, contacts a back of an anchor seat 202 of the anchor 200. An upper end 502 of the guide pipe 500 penetrated through a hole on the anchor seat 202 and projected outwardly from the surface of the anchor seat 202 is widened in opposite directions; therefore, the guide pipe 500 is integrated with the anchor seat 202 of the anchor 200. The widened end 502 of the guide pipe 500 is designed to be partially widened toward each side of the brake shoes 110, 120. However, the widened end shape is not limited to the above described one and may be a widened shape in the direction as long as it can secure the thickness thereof in the direction to the supporting portion 201 of the anchor 200 without becoming an obstacle to components of the drum brake.

The brake cable 400 is comprised of an outer casing 430, an inner cable 410 and so on. A large diameter portion of a casing cap 431, fixed at an end of the outer casing 430, abuts against an outer opening end of the guide pipe 500. A small diameter portion of the casing cap 431 fits into a bore of the guide pipe 500. Then, the brake cable 400 is retained on the guide pipe 500 by a wire spring clip 440. A means to retain the casing cap 431 on the guide pipe 500 may be utilized until the operational end (not shown) of the brake cable 400 is attached on a corresponding member. As an alternative, the casing cap 431 may be press fit into the bore of the guide pipe 500 instead of using the spring clip 440.

The inner cable 410 is slidably inserted into the outer casing 430, and the topside thereof projected out from the casing cap 431 is passed through the guide pipe 500 as shown in FIG. 5. A pin portion of the cable end nipple 420 secured on the tip of the inner cable 410 is connected on the arc-shaped groove 322 of the brake lever 320. A dust boot 411 with bellows is positioned and connected between the casing cap 431 and the cable end nipple 420, performing a water proof function into the outer casing 430. To be lower in weight than the drum brake, a relatively lighter plate material forms the back plate 100. A back plate stiffener 105 is provided only at the 110 area from the central portion to the portion around the anchor 200 on the back plate 100 where required certain high strength and is substantially integrated with the back plate 100 such as by welding.

The back plate 100 and the stiffener 105 are fixed on the brake fixing part 150 (e.g., nonrotatable part on an axle member of the vehicle) having almost same outline of the mounting surface as the stiffener 101 by four fixing bolts 140, 140, 141, 141 and corresponding nuts (not shown in Figures). Each of the two bolts 140, 140 at the anchor 200 side has a serration 142 on its intermediate portion. The serrations 142, 142 are pre-press-forced into the back plate 100 and the back plate stiffener 105, thereby temporary fixing the anchor seat 202 of the anchor 200 and slidably supporting the right side of the brake lever 320 and the left side of the strut 330 on the vertexes of the fixing bolts 140, 140. Finally, the anchor 200 will be firmly fixed to the brake fixing part 150.

Brake operation of the above-explained structured device is explained below. If the operation side of the inner cable 410 (not shown in the figure) is pulled, the intermediate portion of the curved outer casing 430 tends to be deformed to a straight line shape. The casing cap 431 is supported by the guide pipe and the other side of the outer casing 430 (not shown in the figure) are supported by the corresponding member in order to prevent this deformation, thereby transmitting the pulling force onto the cable end nipple 420.

As the pulling force is transmitted to the arc-shaped groove 322 functioning as the input force portion of the brake lever 320, the brake lever 320 rotates counterclockwise in FIG. 5 with respect to the lever pin 310 to move the brake shoe 110 outward, and that reaction force urges the strut 330 to push the brake shoe 120 via the lever pin 310. If such a pressing force overcomes a tension of the shoe return springs 160, 160, both brake shoes 110, 120 spread apart at the point of abutment on the adjuster 130, thereby making a frictional engagement with the brake drum, not shown in the figure.

In FIG. 4, when the brake drum (not shown in the figure) rotates clockwise, the brake shoe 110 is abutted by the supporting portion 201 of the anchor 200, and the left brake shoe 120 becomes supported by the adjuster 130, thereby generating a braking force. Contrary, the brake drum rotates counterclockwise, the brake shoe 120 is abutted by the supporting portion 201 of the anchor 200, and the brake shoe 110 is abutted by the adjuster 130, thereby generating a braking force. Accordingly, both brake shoes 110, 120 have a self-servo function even if the brake drum rotates in either direction, i.e., functioning as a duo-servo (DS) type drum brake.

The above-conventional drum brake suffers from the following drawbacks and deficiencies.

The guide pipe 500 is designed so that the overhanging portion 501 contacts the back (the back plate 100 side) of the anchor seat 202 of the anchor 200, and the upper portion thereof is penetrated through the hole on the anchor seat 202. The known end portion 502 is widened at the terminal end of the guide pipe 500. With this structure, an effective stroke of the brake cable 400 is restricted by a gap between the lower end surface of the brake lever 320 and the widened end 502 of the guide pipe 500. If the distance (brake off-set) H from the brake mounting surface to the center of the brake shoes 110, 120 is too short, it becomes difficult to design the layout of the brake cable mounting section and of the mechanical expander 300.

The overall length of the guide pipe 500 must be longer, which is another disadvantage when considering the cost of manufacturing.

During the brake operation, the anchor 200 receives the brake force of the brake shoes 110, 120 and the operational reaction force on the outer casing 430 via the guide pipe 500. Therefore, the anchor 200 needs to be stronger which is another disadvantage in considering the weight and cost.

SUMMARY AND OBJECT OF THE INVENTION

This invention improves upon the aforementioned problems in the prior art and provides a brake cable mounting structure for a drum brake, in which even if the distance from the brake mounting surface to the center of the brake shoes in the width direction is short, an efficient and effective layout of the brake cable mounting section and the mechanical expander is facilitated. Further, the load acting on the anchor may be reduced, which eliminates the uncertainty of the anchor strength.

With this invention, no projection on the anchor seat toward the mechanical expander side (i.e., widened end of the guide pipe in the conventional part) is necessary; therefore the range of the effective stroke of the brake cable is increased. Accordingly, even if the distance from the brake fixing portion to the brake shoe center in the width direction, i.e., brake off-set, is short, the layout of the brake mounting section and the mechanical expander is facilitated.

Further, an operational reaction force during the parking brake operation is supported by the back plate. Hence, the anchor supports the braking force, which enables to be designed smaller and lighter.

A widened end of the guide pipe is positioned in the pocket, thus, a through hole for the inner cable with the cable end nipple opened on the anchor seat may be made smaller which also reduces the size of the anchor.

Since the guide pipe is mounted on the back plate, the overall length of the guide pipe is reduced, which also reduces the cost of manufacturing the device.

The objectives and advantages of this invention are achieved by a brake cable mounting structure for a drum brake comprising a mechanical expander having an input force portion, where the expander is disposed adjacent to a pair of adjacent facing ends of brake shoes moveably mounted on a back plate so as to actuate said brake shoes. The mounting structure also comprises a brake cable having an inner cable is connected with said input force portion of the mechanical expander and the brake cable has an outer casing. The mounting structure further comprises a guide pipe guides the inner cable to pass out of said drum brake, where the outer casing is attached to said guide pipe, and where the guide pipe is fixed on said back plate.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE INVENTION

Embodiments of this invention are explained with reference to the following figures. Here, except for the guide pipe fixing portion, the rest of components of the drum brake and the brake operation are similar to the conventional device illustrated in FIGS. 4–7, hence the similarly parts or the similar portions are numbered as same as the conventional device, while the explanation of those components will be omitted.

Figure 1:
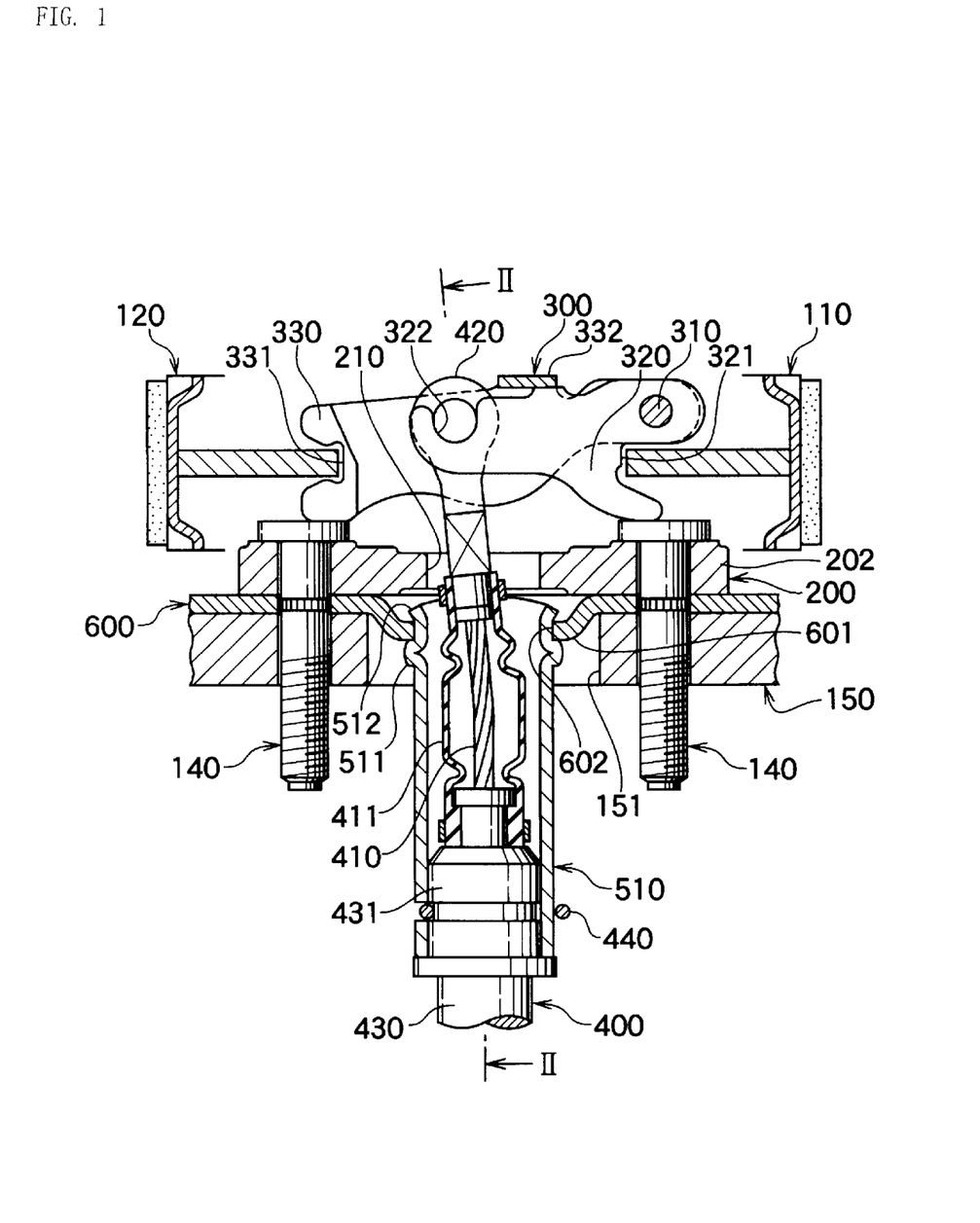
FIG. 1 is an explanation view of the brake actuating part of first embodiment.
Figure 2:
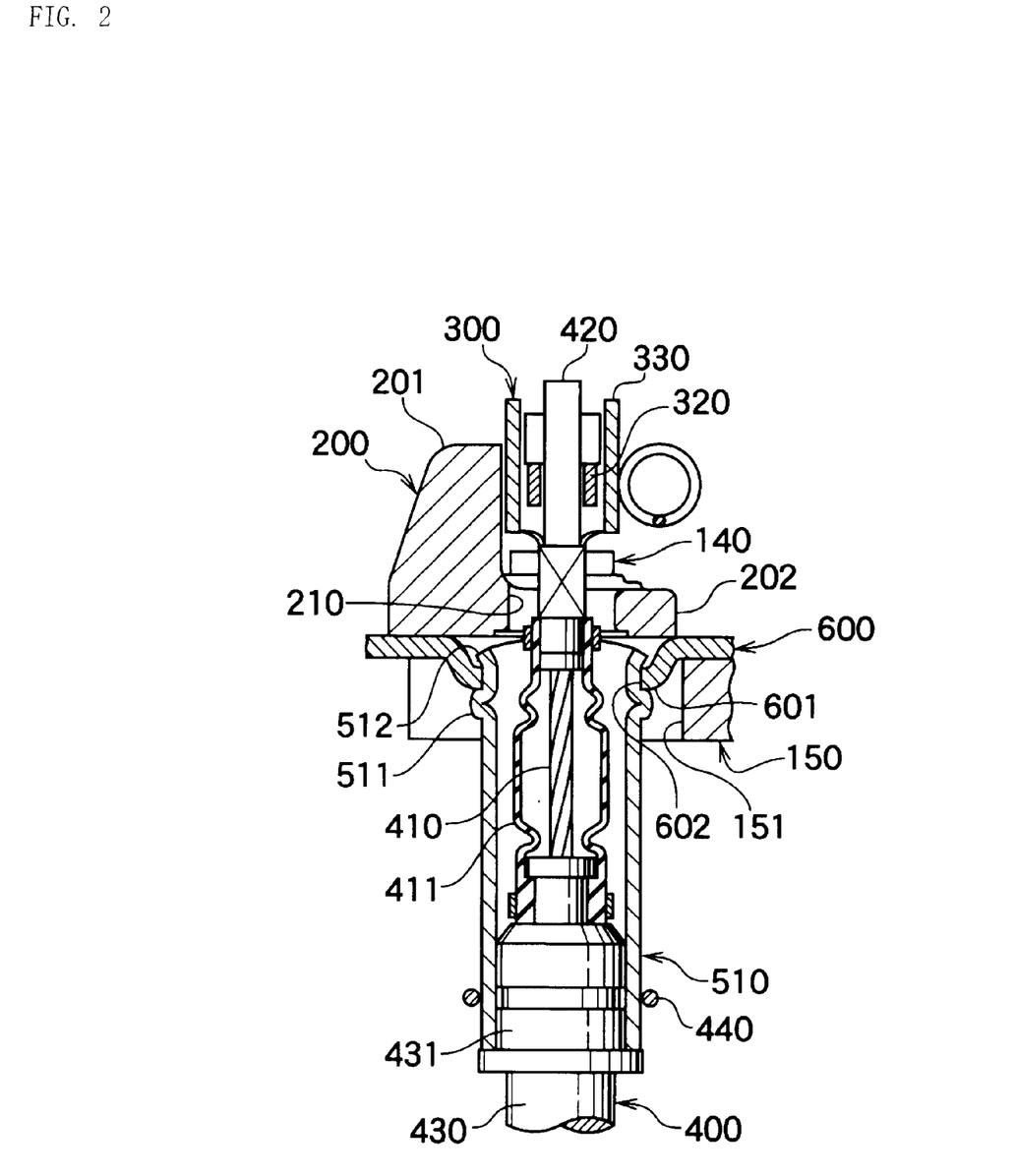
FIG. 2 is a cross-section view of FIG. 1 taken along the line II—II.

As shown in FIGS. 1 and 2, first invention includes a guide pipe 510 for guiding a brake cable 400 out of a drum brake fixing on a back plate 600.

In this embodiment, the back plate 600 is not formed out of a superposed-steel plate but is formed of a steel sheet, which is fixed on a brake fixing part 150 (e. g., non-rotatable part on an axle member of the vehicle) by bolts 140, 140, 141, 141. Simultaneously, an anchor 200 is firmly fixed to the brake fixing part 150 by the bolts 140, 140.

A guide pipe 510 is fixed on a guide pipe fixing portion 601 on the back plate 600, wherein the guide pipe fixing portion 601 has a insertion hole 602 for the insertion of a guide pipe 510 as well as a funnel shape portion protruding into a notched groove 151 of the brake fixing part 150.

One end of the guide pipe 510 penetrates through the insertion hole 602 of the back plate 600 from the brake fixing part 150 side, and an overhanging portion 511 integrally formed on the intermediate portion thereof contacts a back of the guide pipe fixing portion 601. An end of the guide pipe 510, projected outwardly from the guide pipe fixing portion 601 at the anchor 200 side, is formed to be a widened end 512. Therefore, the guide pipe 510 is significantly integrated with the back plate 600.

An operational reaction force generated during the parking brake operation is supported and absorbed by the back plate 600 via the guide pipe 510. Hence, the anchor 200 only needs to bear a braking force, which enables to be designed smaller and lighter. The widened end 512 of the guide pipe 510 may be positioned in a pocket of the guide pipe fixing portion 601 on the back plate 600. Hence, the widened end 512 of the guide pipe 510 does not need to be projected out from the anchor seat 202 of the anchor 200 toward the mechanical expander 300 unlike the conventional art. Therefore, the range of effective stroke of the brake cable 400 is increased. Accordingly, this structure is effective even if the distance from the brake fixing portion to the brake shoe center in the width direction, i.e., brake off-set, is short.

For the structure of installing the outer casing 430 on the guide pipe 510 in this invention, the large diameter portion of the casing cap 431 of the outer casing 430 contacts the outer opening end surface of the guide pipe 510 and at the same time the small diameter top portion thereof fits into the bore of the guide pipe 510. After that, the brake cable 400 is fixed on the guide pipe 510 by a wire spring clip 440. However, the brake cable 400 once properly attached is securely affixed to the operational end (not shown) of the brake cable 400 on the corresponding member. Therefore, the casing cap 431 may be press fit into the bore of the guide pipe 510 instead of using the spring clip 440. The diameter of a through hole 210 formed on the anchor seat 202 of the anchor 200 only need penetrate through the inner cable 410 with the cable end nipple 420; thus may be designed smaller, thereby further reducing the size of the anchor seat 202.

The overhanging portion 511 of the guide pipe 510 may be formed by expanding the intermediate portion of the guide pipe 510 outwardly. An independent flat washer-like ring may be jointed over the guide pipe 510 instead of the overhanging portion 511 as shown to add the large diameter overhanging portion on the guide pipe 510. Besides the above-described means to fix the guide pipe 510 on the back plate 600, the guide pipe 510 may be fixed by other suitable means such as being welded on the back plate 600.

The guide pipe fixing portion 601 on the back plate 600 may be designed to be a flat, where a diameter of the inner cable through hole 210 of the anchor 200 may be made large to store the widened end 512 of the guide pipe 510.

Figure 3:
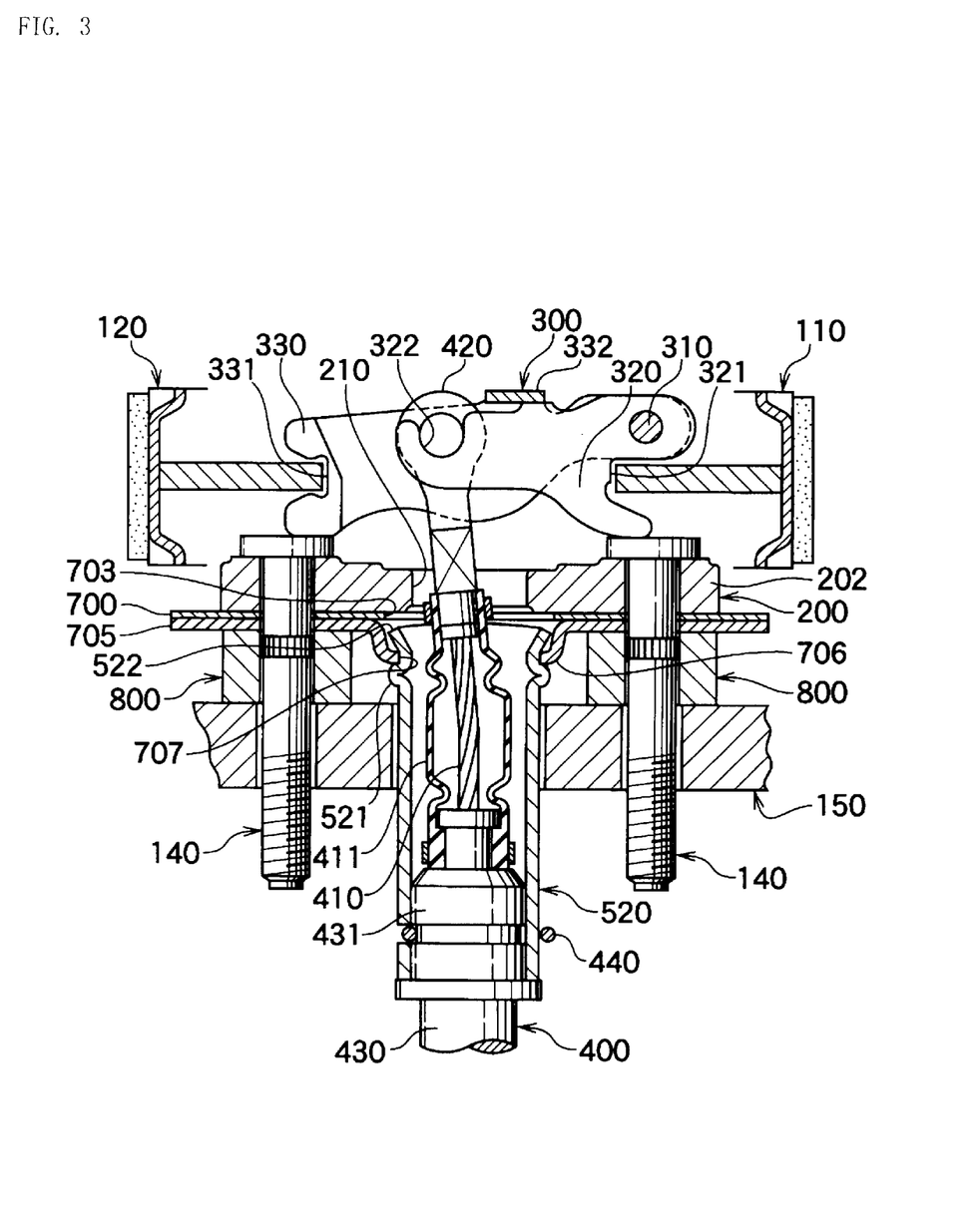
FIG. 3 is an explanation view of the brake actuating part of second embodiment.

FIG. 3 shows a case where a back plate is configured in combination of an independently formed back plate body 700 superimposed on an independent back plate stiffener 705 as a reinforcing plate supporting the back plate body 700.

This second embodiment describes in case which a spacer 800 is sandwiched between the brake fixing part 150 and the back plate stiffener 705, where the anchor 200, the back plate body 700, the back plate stiffener 705, and the spacers 800, 800 are fixed on the brake fixing part 150 by the bolts 140, 140. The spacers 800, 800 may be omitted without substantially reducing the effectiveness.

The guide pipe fixing portion 706 of the guide pipe 520 in this second embodiment is different from the first embodiment in that the guide pipe fixing portion 706 is formed only on the back plate stiffener 705. That is, the guide pipe fixing portion 706 is positioned in a space between two spacers 800 and 800 and is designed to be a funnel shape portion protruding toward the brake fixing part 150. Further, the guide pipe insertion hole 707 is opened on the back plate stiffener 705 for the installation of the guide pipe 520. A portion of the back plate body 700 adjacent to the guide pipe insertion hole 707 is a flat and has a through hole 703 for an inner cable 410 with a cable end nipple 420 to be penetrated through.

One end of the guide pipe 520 penetrates through the insertion hole 707 of the back plate stiffener 705 from the brake fixing part 150 side, and an overhanging portion 521 contact a back of the guide pipe fixing portion 706. An end of the guide pipe 520, projected outwardly from the guide pipe fixing portion 706 at the anchor 200 side, is formed to be a widened end. Therefore, the guide pipe 520 integrated with or fixed relative to the back plate stiffener 705.

Accordingly, the widened end 522 of the guide pipe 520 may be positioned in the pocket of the guide pipe fixing portion 706 on the back plate stiffener 705. Hence, the widened end 522 of the guide pipe 520 does not need to projected out from the anchor seat 202 of the anchor 200 toward the mechanical expander unlike the conventional art.

Although it is not shown in FIG. 3, a funnel shape portion may be formed on the back plate body 700 for fixing the guide pipe 520, and alternatively, funnel shape portions may be formed both on the back plate body 700 and the back plate stiffener 705 for fixing the guide pipe 520 without difficulty.

The above-described embodiments employ a brake cable mounting structure for a duo-servo (DS) type drum brake device where one adjacent facing ends of a pair of brake shoes 110, 120 is supported by the anchor 200, while the other adjacent facing ends thereof is connected via the adjuster 130. However, this invention is not limited to the application in the DS type. For example, a fixed anchor as shown in the German Utility Mode Gazette No. DE7116427 may be employed instead of the conventional adjuster 130 as appeared in FIG. 4, which enables the brake cable mounting structure of this invention to be used in a leading-trailing (LT) type drum brake device.

Alternatively, the brake cable fixing device of this invention may be applied in a dual mode drum brake as shown in the U.S. Pat. No. 5,720,367 which functions as the LT type drum brake when a service brake is in operation but functions as the DS type when a parking brake is in operation. Basically, the brake cable mounting structure of this invention is applicable to any drum brake device with the mechanical expander 300 and the guide pipe 510, 520.

Because of the particular structure described above, this invention has the following effects.

No projection on the anchor seat toward the mechanical expander side (i.e., widened end of the guide pipe in the conventional part) is necessary; therefore the range of the effective stroke of the brake cable is increased. Accordingly, even if the distance from the brake fixing portion to the brake shoe center in the width direction, i.e., brake off-set, is short, the layout of the brake mounting section and the mechanical expander is facilitated.

An operational reaction force during the parking brake operation is supported by the back plate. Hence, the anchor supports the braking force, which enables to be designed smaller and lighter.

Widened end of the guide pipe is positioned in the pocket, thus, a through hole for the inner cable with the cable end nipple opened on the anchor seat may be made smaller which also reduces the size of the anchor.

Since the guide pipe is mounted on the back plate, the overall length of the guide pipe is reduced, which also reduces the cost of manufacturing the device.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A brake cable mounting structure for a drum brake comprising:
   a mechanical expander having an input force portion, said expander disposed adjacent to a pair of adjacent facing ends of brake shoes moveably mounted on a back plate so as to actuate said brake shoes;
   a brake cable having an inner cable connected with said input force portion of said mechanical expander and having an outer casing; and
   a guide pipe for guiding said inner cable to pass out of said drum brake, said outer casing being attached to said guide pipe, wherein
      said guide pipe penetrates through a guide pipe insertion hole of said back plate and projects outwardly from a guide pipe fixing portion of said back plate,
      a large diameter overhanging portion provided on an intermediate portion of said guide pipe contacts said back plate at a brake fixing part side,
      a projected outwardly end tip of said guide pipe is formed to be a widened end, and
      said guide pipe is securely fixed on said back plate between said overhanging portion and said widened end.

2. The brake cable mounting structure for a drum brake as claimed in claim 1, wherein
   said back plate is configured to be integrated by superposing an independently formed back plate body and a back plate stiffener.

3. The brake cable mounting structure for a drum brake as claimed in claim 1, wherein
   an anchor supporting one adjacent ends of both brake shoes is positioned adjacent to said mechanical expander.

4. The brake cable mounting structure for a drum brake as claimed in claim 1, wherein
   said guide pipe fixing portion of said back plate is designed to be a convex shape toward said brake fixing part side.

* * * * *